July 11, 1933. H. RÜHLEMANN 1,917,813
DEVICE FOR PROVIDING ENERGY FOR ELECTRICAL IGNITORS
Filed April 20, 1932
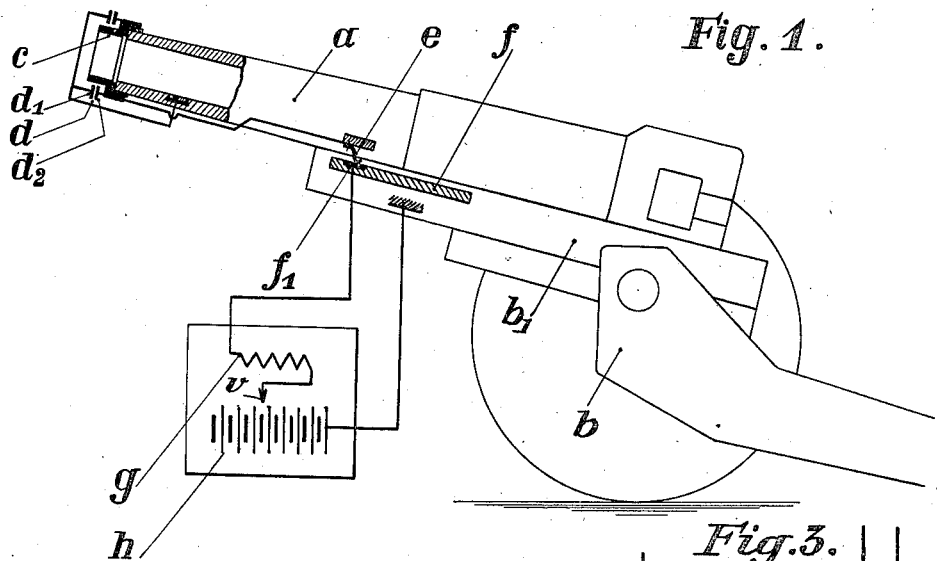
Fig. 1.
Fig. 3.
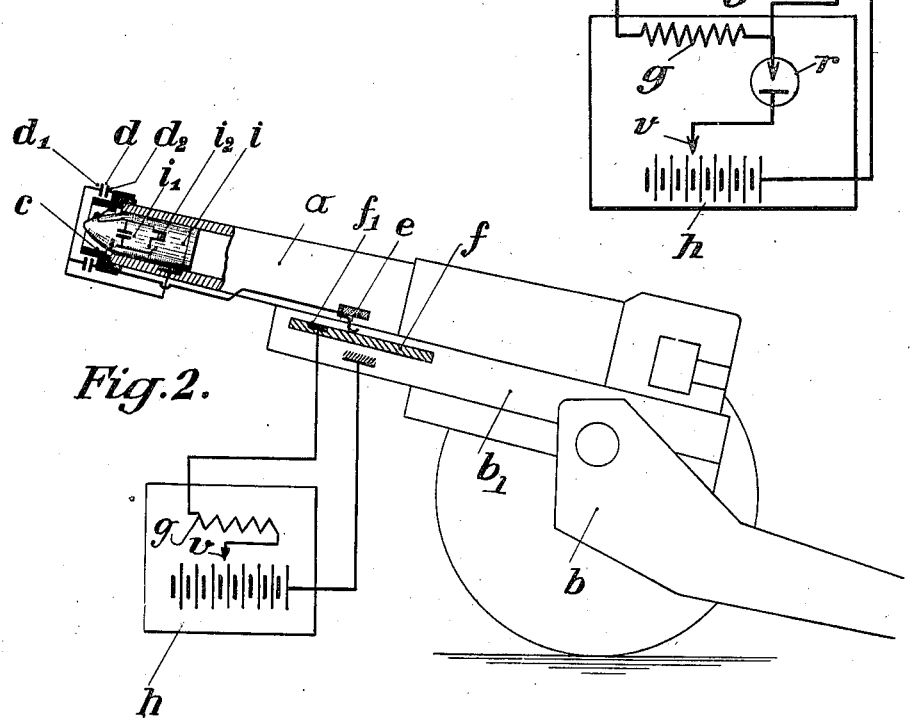
Fig. 2.
Inventor:
Herbert Rühlemann
By
Attorney Patented July 11, 1933

1,917,813

UNITED STATES PATENT OFFICE

HERBERT RÜHLEMANN, OF SOMMERDA, GERMANY, ASSIGNOR TO RHEINISCHE METALLWAAREN- UND MASCHINENFABRIK, OF DUSSELDORF-DERENDORFF, GERMANY

DEVICE FOR PROVIDING ENERGY FOR ELECTRICAL IGNITORS

Application filed April 20, 1932, Serial No. 606,488, and in Germany April 27, 1931.

The electrical ignitors, which are used as percussion, time, or double ignitors for shells, grenades, or mines, or for the ignition of other bodies containing explosive charges, are particularly advantageously constructed with respect to capability of storage, operation and manipulation in that the electrical energy necessary for igniting the ignitor or fuse or for causing such ignition thereof is not contained therein in any form whatever, for example, in dry batteries or wet batteries, ab initio, but receive their charge from a special source of current only when they are ready for use, by being transiently connected to such source of current.

As far as hereby is involved the introduction of energy, which must have a very definite exactly predetermined magnitude for initiating certain procedures, for example, a time ignition, with respect to the amount of current, the current strength or the voltage, provision must be made that the energy must be available in stored form in a source of current in the required degree and also in such form which would provide an amount of energy as free as possible from loss and above all things a rapid transfer of the amount of energy necessary into the ignitor. This is particularly important in electrical ignitors for shells which receive their energy from a source of current only after firing of the shell and while the latter is moving past a contact device arranged in front of the muzzle of the gun barrel, where then, for the transfer of the energy, only small fractional parts of a second are available. The known sources of current, a possibly available connection to a permanent electrical main or generators portable with the gun, dry or wet batteries, do not alone suffice for the purpose. They contain too little energy in the form of stored-up electricity to be capable of giving off, in the available very short time interval, the requisite amount of electricity, and rather must supply the lacking amount only during the discharge, by continuous subsequent generation. The result is that the quantity, strength, or voltage of the current which is in fact supplied to the ignitor is too small and does not suffice to produce the effect required thereof in the prescribed manner; thus duds and errors or failures of ignition may occur.

The invention avoids these defects and makes possible, with certainty, the transfer of the necessary electrical energy into the ignitor even within the briefest interval of time occurring in practice. According to the same the electrical energy is supplied to the ignitor from a condenser wherein a reserve supply is maintained stored, or from a condenser arrangement. The charging of this condenser, hereinafter referred to as the "charging condenser" whose capacity preferably is many times the amount of current requisite for an ignitor, is accomplished by means of one of the previously mentioned known sources of current. Thereby the charging condenser may be continuously, that is, also even during the withdrawal of energy therefrom by the ignitor, connected to a source of current maintaining it under voltage. Then preferably, between the condenser and its source of current, means for delaying or preventing the back-flow of current from the condenser, for example, a high resistance or a rectifier, is connected. Thereby during the short time of the actual withdrawal of energy from the charging condenser to the ignitor, the source of current, in spite of its connection with the charging condenser, is practically eliminated as to any effect upon the latter and thereby any effect upon the charging process; inductive back-kicks toward the source of current, which might disturb the flow of current from the charging condenser into the ignitor, do not occur. On the other hand, such a resistance also will prevent high surges of current which might be injurious to the source of current itself, when the charging condenser, after giving off its stored energy, again replenishes the same from the source of current.

The storage or charging condenser may however be made so as to be disconnectable from its source of current in order to prevent a disturbing effect upon the charging of the ignitor. This is preferably accomplished by means of a switch which is controlled positively in dependence upon a device for connecting the ignitor, which is to be charged, to the terminals of the charging condenser, so that the charging condenser is separated from the source of current during the time that it is delivering its energy to the ignitor.

In order to prevent losses in the conductors, as well as to make the flow of current from the charging condenser as unrestricted as possible and allow it to take place even within a small fractional portion of even the shortest time interval available therefor in practice, by reducing the resistance of the conductors, the charging condenser may be arranged in the immediate vicinity of the current feeding means which supplies the energy to the ignitor to be charged, so that, particularly for charging devices for shell ignitors having charging terminals arranged in front of the muzzle of the gun, it may be arranged directly upon the same.

The drawing shows the diagram of connections of a charging device, of the last-named type, on a recoil gun, in accordance with the invention, and in said drawing:—

Figure 1 shows the normal position of the parts before firing and

Fig. 2 after the firing, at the instant of charging the ignitor of the projectile or shell.

Fig. 3 is a fragmentary detail showing the source of energy together with a resistance and a rectifier.

Upon the muzzle of the barrel $a$ of a recoil gun $b$ is arranged a ring $c$ which is insulated with respect to the barrel and the inner diameter of which is somewhat greater than the caliber of the barrel. Upon the ring $c$, for example, wound around the same, there is a condenser $d$, the charging condenser, having the two coatings or armatures $d_1$ and $d_2$. This might also consist of a condenser arrangement comprising a plurality of individual condensers connected together in series or in parallel and distributed around the muzzle of the gun. One coating $d_1$ of the condenser $d$ is grounded to the barrel $a$, and its second coating $d_2$ is connected through the ring $c$ to a sliding contact $e$ secured to the barrel but insulated therefrom, which in the movements of the barrel after the firing slides upon a bar $f$ located upon the cradle $b_1$ of the barrel. When the barrel $a$ is in its forward position the sliding contact $e$ lies upon a contact element $f_1$ of the bar $f$ which is connected through a resistance $g$ to one pole or terminal of a source of current $h$, for example a battery, which is arranged in a suitable manner upon the gun or is located remotely therefrom. The second pole or terminal of the source of current $h$ is connected through the body of the gun to the coating $d_1$ of the condenser $d$.

In addition to, or in place of, the resistance $g$, a rectifier $r$ may also be inserted in the circuit to prevent undesired reverse flow of current from the condenser $d$ to the source of energy $h$. It is obvious that a rectifier will absolutely prevent such back-flow, whereas a sufficiently high resistance will merely greatly delay the back-flow, but yet will serve a similar purpose, so that either the rectifier or the resistance may be employed alone, or if preferred both may be used jointly. The rectifier may, of course, be of any suitable type and is not further described here inasmuch as rectifiers of many kinds are well known in the electrical arts.

The electrical ignitors of the shells $i$ (Fig. 2) fired from the gun contain, for example, a condenser $i_1$ as means for storing the ignition current, which is charged by means of the energy stored up in the charging condenser $d$ when the shell leaves the gun, at the muzzle of the barrel, and which delivers up its energy, for example, when the shell strikes its target, through an igniting agent $i_2$. For the purpose of charging the ignitor condenser $i_1$ a contact element $i_3$ which can swing radially outward is arranged externally upon the ignitor, and which is in contact with one coating of the ignitor condenser $i_1$. The second coating or armature thereof is connected with the body of the ignitor and thereby through the shell and the barrel of the gun with one coating $d_1$ of the charging condenser $d$.

Before the firing of a shot, the charging condenser $d$ is connected, on the one hand, through the body of the gun and, on the other hand, through the resistance $g$ and the sliding switch $f_1$ and $e$ to the source of current $h$, and is charged to a predetermined voltage, which then at the same time also exists between the ring $c$ and the barrel $a$. After the firing of a shot the barrel $a$ moves back or recoils and the source of current $h$ becomes disconnected from the charging condenser $d$ by reason of the fact that the sliding contact $e$ slides off of the stationary cooperating contact element $f_1$. This is accomplished by suitable dimensioning of the length of the contact element $f_1$, before the projectile $i$ has reached the muzzle of the barrel and before the ignitor contact element $i_3$ thereof, which swings outwardly after leaving the muzzle of the barrel, has come into contact with the ring $c$. At the instant that contact is made between $i_3$ and $c$ the ignitor condenser $i_1$ is charged to the voltage necessary for producing the desired manner of operation, from the charging condenser $d$. When the barrel $a$ runs back into its forward end position the sliding switch $e$, $f_1$ again connects the source of current $h$ to the charging condenser $d$ and the latter is again charged, whereby the resistance $g$ prevents large surges of current, which might be injurious to the source of current $h$. The voltage supplied from the source of current $h$ may be varied if desired in any suitable way, as designated conventionally by the variable connection $v$. While a battery is shown, it is obvious that the source of current $h$ may equally well be any other source capable of supplying direct current of suitable voltage.

I claim as my invention:—

1. Device for furnishing electrical energy to ignitors from a remote point, comprising electrical capacity means, means whereby electrical energy is fed to the ignitor from said capacity means, a source of current of suitable voltage, means continuously connecting said source of current to the capacity means to maintain it properly charged and an electrical instrumentality within the connecting means to retard or prevent a back-flow of current from the capacity means to the source of current.

2. Device for furnishing electrical energy to ignitors from a remote point, comprising electrical capacity means, means whereby electrical energy is fed to the ignitor from said capacity means, a source of current of suitable voltage, means continuously connecting said source of current to the capacity means to maintain it properly charged and a high resistance within the connecting means to practically prevent a back-flow of current from the capacity means to the source of current.

3. Device for furnishing electrical energy to ignitors from a remote point, comprising electrical capacity means, means whereby electrical energy is fed to the ignitor from said capacity means, a source of current of suitable voltage, means continuously connecting said source of current to the capacity means to maintain it properly charged and a rectifier within the connecting means to retard or prevent a back-flow of current from the capacity means to the source of current.

4. A device for furnishing electrical energy to ignitors from a remote point, comprising a condenser for feeding electrical energy to the ignitor, a source of current of suitable voltage continuously connected to said condenser to maintain it properly charged, and means for interrupting the connection between the condenser and the source of current.

5. A device for furnishing electrical energy to ignitors from a remote point, comprising a condenser for feeding electrical energy to the ignitor, a source of current of suitable voltage continuously connected to said condenser to maintain it properly charged, and a switch in the connecting means, for interrupting the connection between the condenser and the source of current and an instrumentality for connecting the ignitor which is to be charged to the terminals of the condenser, said instrumentality serving also to actuate the switch to disconnect the condenser from the source of current during the time that it is delivering energy to the ignitor.

6. Device for providing energy for electrical ignitors for projectiles to be fired from recoil-guns, comprising a condenser for feeding electrical energy to the ignitor and being arranged closely adjacent the barrel of the gun, a source of current of suitable voltage continuously connected to said condenser to maintain it properly charged, and a switch arranged within the connecting means between the source of current and the condenser, said switch comprising two contact elements, one of which is connected to the barrel and which therefore moves with said barrel, and when the barrel is in the forward position lies against the second contact element which is applied to a portion of the gun which does not partake of the recoil movement of the barrel, whereby as a result of the recoil of the barrel which takes place upon firing, the movable contact element slides off from the said stationary contact element and interrupts the connection of the charging condenser with its source of current before the ignitor of the projectile comes into contact with the energy-feeding means adjacent the barrel, and which thus causes the transfer of energy from the condenser into the ignitor 7. Device cooperating with a gun, for furnishing electrical energy to ignitors of shells fired from said gun, from a remote point, comprising a condenser located adjacent the muzzle of the gun, means whereby electrical energy is fed to the ignitor from said condenser, also located near the said muzzle, and having charging terminals arranged in front of the muzzle, to cooperate with the ignitors, a source of current of suitable voltage and means continuously connecting said source of current to the condenser to maintain it properly charged.

8. Device for supplying electrical energy to shells as they are fired from guns, comprising condenser means arranged adjacent the barrel of the gun, and a source of electrical current to maintain the condenser means properly charged whereby the shell is energized from the condenser means when it leaves the barrel of the gun.

9. A device for supplying electrical energy to shells as they are fired from guns, comprising a condenser arranged adjacent the muzzle of the gun, and a source of electrical current to maintain the condenser properly charged whereby the shell is energized from the condenser when it leaves the muzzle of the gun.

10. An electrical system for supplying electrical energy to shells as they are fired from guns, comprising a condenser arranged in cooperation with the barrel of the gun, a source of current, and connections between the condenser and the source of current to maintain the condenser properly charged whereby the shell is energized from the condenser when it passes through the barrel of the gun.

11. An electrical system for supplying electrical energy to shells as they are fired from guns, comprising a condenser arranged adjacent the muzzle of the gun, a source of current, and connections between the condenser and the source of current to maintain the condenser properly charged whereby the shell is energized from the condenser when it leaves the muzzle of the gun.

12. An electrical system for supplying electrical energy to shells as they are fired from guns, comprising a condenser arranged adjacent the muzzle of the gun, a source of current, connections between the condenser and the source of current to maintain the condenser properly charged whereby the shell is energized from the condenser when it leaves the muzzle of the gun, and means for breaking the current between the source of current and the condenser upon recoil of the gun.

13. A device for supplying electrical energy to shells as they are fired from guns, comprising electrical capacity means arranged adjacent the barrel of the gun, a source of electrical current to maintain the capacity means properly charged, whereby the shell is energized from the capacity means when it leaves the barrel of the gun, and means for automatically setting the source of electrical current in communication with the capacity means.

14. A device for supplying electrical energy to shells as they are fired from guns, comprising a condenser arranged adjacent the barrel of the gun, a source of electrical current to maintain the condenser properly charged, whereby the shell is energized from the condenser when it leaves the barrel of the gun, and means for automatically setting the source of electrical current in communication with the condenser.

15. An electrical system for supplying electrical energy into the electric circuit of a shell as it is fired from a gun, which includes a condenser associated with the barrel of the gun for transferring the electrical energy therefrom into the circuit of the shell as the shell passes the condenser upon being forced through the gun.

16. A device for transferring electrical energy into the electrical equipment of explosive bodies as they are released, comprising a condenser adapted to receive a charge of electrical energy and store it therein, and means for directing the body adjacent the condenser so that the electrical energy in the condenser will be transferred to the electrical equipment in the body.

In testimony whereof, I affix my signature.

HERBERT RÜHLEMANN.